(12) United States Patent
Grove et al.

(10) Patent No.: US 11,060,696 B2
(45) Date of Patent: *Jul. 13, 2021

(54) DIRECT/INDIRECT LUMINAIRE SYSTEMS AND METHODS

(71) Applicant: ABL IP Holding LLC, Atlanta, GA (US)

(72) Inventors: Douglas Dewayne Grove, Grayson, GA (US); Benjamin Bruckner, Snellville, GA (US)

(73) Assignee: ABL IP Holding LLC, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/991,543

(22) Filed: Aug. 12, 2020

(65) Prior Publication Data

US 2021/0080077 A1    Mar. 18, 2021

Related U.S. Application Data

(63) Continuation of application No. 16/572,949, filed on Sep. 17, 2019, now Pat. No. 10,775,018.

(51) Int. Cl.
| *F21V 7/00* | (2006.01) |
| *F21S 6/00* | (2006.01) |
| *F21S 8/06* | (2006.01) |
| *F21S 8/04* | (2006.01) |

(52) U.S. Cl.
CPC ............ *F21V 7/0016* (2013.01); *F21S 6/008* (2013.01); *F21S 8/046* (2013.01); *F21S 8/061* (2013.01)

(58) Field of Classification Search
CPC ........ F21V 7/0016; F21V 27/00; F21V 27/02; F21V 2200/00; F21V 2200/20; F21V 2200/40; F21S 6/008; F21S 8/061; F21S 8/063
See application file for complete search history.

(56) References Cited

U.S. PATENT DOCUMENTS

| 6,871,983 B2 | 3/2005 | Jacob et al. |
| 8,192,051 B2 | 6/2012 | Dau et al. |
| 8,277,106 B2 | 10/2012 | Van Gorkom et al. |

(Continued)

OTHER PUBLICATIONS

U.S. Appl. No. 16/572,949, "Non-Final Office Action", filed Mar. 20, 2020, 16 pages.

(Continued)

*Primary Examiner* — William N Harris
(74) *Attorney, Agent, or Firm* — Kilpatrick Townsend & Stockton LLP

(57) ABSTRACT

A luminaire includes a housing, a downlight that includes one or more first light sources configured to emit a first light downwardly from the housing, a waveguide, and one or more second light sources. The waveguide is formed of a portion of an optical material and characterized by opposing planar faces joined by one or more edge faces about a periphery of the optical material. The waveguide forms at least a portion of an uppermost optical surface of the luminaire. The one or more second light sources are coupled with the housing and configured to emit a second light into the optical material through at least one of the one or more edge faces. The waveguide is configured to emit at least a portion of the second light upwardly from an upper one of the planar faces.

20 Claims, 8 Drawing Sheets

(56) References Cited

U.S. PATENT DOCUMENTS

| | | |
|---|---|---|
| 8,534,896 B2 | 9/2013 | Boonekamp |
| 8,591,079 B2 | 11/2013 | Chang |
| 9,268,082 B2 | 2/2016 | Van Dijk et al. |
| 9,291,767 B2 | 3/2016 | Boonekamp |
| 9,429,285 B2 | 8/2016 | Chung et al. |
| 9,494,295 B2 | 11/2016 | Albrecht et al. |
| 9,651,730 B2 | 5/2017 | Sui et al. |
| 9,655,191 B2 | 5/2017 | Vissenberg et al. |
| 9,752,754 B2 | 9/2017 | Trincia et al. |
| 9,784,432 B2 * | 10/2017 | Allen ................ F21V 7/05 |
| 9,846,272 B2 | 12/2017 | Dau et al. |
| 10,281,096 B2 | 5/2019 | Stormberg et al. |
| 2012/0026751 A1 | 2/2012 | Lin et al. |
| 2012/0069595 A1 | 3/2012 | Catalano |
| 2012/0163027 A1 | 6/2012 | Vissenberg et al. |
| 2012/0281432 A1 | 11/2012 | Parker et al. |
| 2014/0192558 A1 | 7/2014 | Dau et al. |
| 2014/0293645 A1 | 10/2014 | Ohno et al. |
| 2015/0211710 A1 | 7/2015 | Speier |
| 2015/0373806 A1 * | 12/2015 | Vissenberg ........ F21V 7/0016 |
| | | 315/151 |
| 2015/0378088 A1 * | 12/2015 | Stormberg ............ F21S 8/046 |
| | | 362/606 |
| 2017/0016597 A1 | 1/2017 | Engelen et al. |
| 2017/0031080 A1 | 2/2017 | Speer et al. |
| 2017/0299146 A1 | 10/2017 | Meerbeek et al. |
| 2018/0210136 A1 * | 7/2018 | Stormberg ............ F21V 7/0016 |

OTHER PUBLICATIONS

U.S. Appl. No. 16/572,949, "Notice of Allowance", filed May 6, 2020, 9 pages.

* cited by examiner

DIRECT/INDIRECT LUMINAIRE SYSTEMS AND METHODS

CROSS-REFERENCE TO RELATED APPLICATIONS

The present application is a continuation of, and claims priority to, U.S. patent application Ser. No. 16/572,949 for "Direct/Indirect Luminaire Systems and Methods," filed Sep. 17, 2019 and incorporated by reference herein in its entirety for all purposes.

BACKGROUND

Luminaires, or light fixtures, may be designed to meet goals such as emitted light distribution, power consumption, cost, size, and visual aesthetics. Certain luminaires provide direct and indirect light. Such luminaires typically emit a portion of light downwardly for direct lighting of an illuminated area, and another portion upwardly to reflect from high surfaces such as walls and/or a ceiling. A portion of the upwardly emitted light that scatters from the high surfaces provides additional light to the illuminated area. It also provides the aesthetic benefit of making the overall illumination feel more natural, by mitigating the high contrast of the downwardly emitted light against dark upper surfaces.

SUMMARY

In one or more embodiments, a luminaire includes a housing, a downlight that includes one or more first light sources configured to emit a first light downwardly from the housing, a waveguide, and one or more second light sources. The waveguide is formed of a portion of an optical material and characterized by opposing planar faces joined by one or more edge faces about a periphery of the optical material. The waveguide forms at least a portion of an uppermost optical surface of the luminaire. The one or more second light sources are coupled with the housing and configured to emit a second light into the optical material through at least one of the one or more edge faces. The waveguide is configured to emit at least a portion of the second light upwardly from an upper one of the planar faces.

In one or more embodiments, a method of lighting an area with a suspended luminaire includes providing a luminaire that includes a housing, first and second light sources, and a waveguide that forms at least a portion of an uppermost optical surface of the luminaire. The waveguide is formed of a portion of an optical material and characterized by opposing planar faces joined by one or more edge faces about a periphery of the optical material. The method also includes emitting a first light downwardly from the first light source, emitting a second light, from the second light source, into one or more of the edge faces of the waveguide, and scattering at least a first portion of the second light upwardly from the waveguide, through an upper one of the planar faces.

BRIEF DESCRIPTION OF THE DRAWINGS

Embodiments are described in detail below with reference to the following figures.

DETAILED DESCRIPTION

Figure 1:
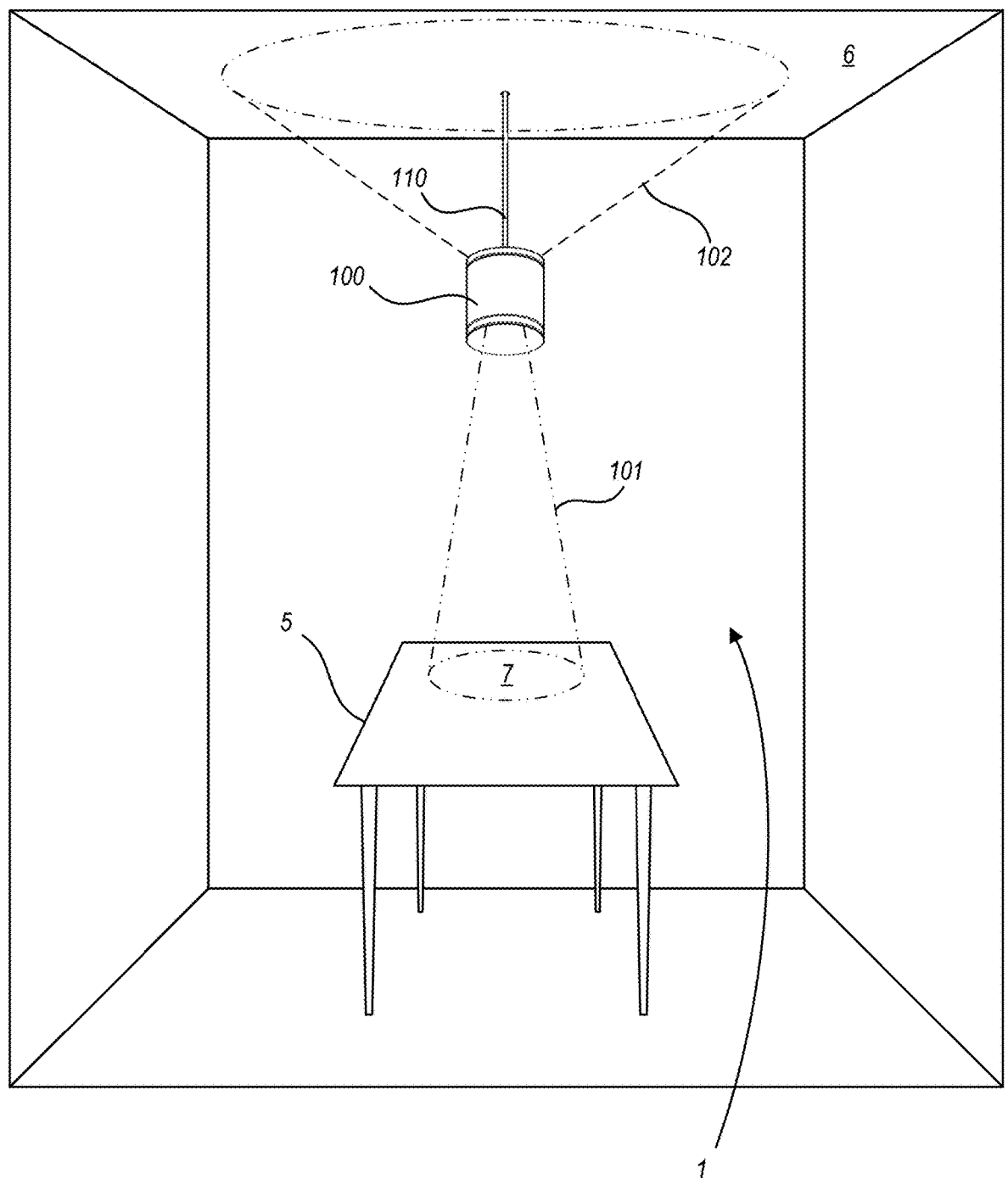
FIG. 1 schematically illustrates a space that is illuminated by a direct/indirect luminaire, according to one or more embodiments.

The subject matter of embodiments of the present invention is described here with specificity to meet statutory requirements, but this description is not intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described. Each example is provided by way of illustration and/or explanation, and not as a limitation. For instance, features illustrated or described as part of one embodiment may be used on another embodiment to yield a further embodiment. Upon reading and comprehending the present disclosure, one of ordinary skill in the art will readily conceive many equivalents, extensions, and alternatives to the specific, disclosed luminaire types, all of which are within the scope of embodiments herein.

In the following description, positional terms like "above," "below," "vertical," "horizontal" and the like are sometimes used to aid in explaining and specifying features illustrated in the drawings as presented, that is, in the orientation in which labels of the drawings read normally. These meanings are adhered to, notwithstanding that the luminaires herein may be mounted to surfaces that are not horizontal. When light is said to be emitted "downwardly" at least most of such light is emitted across one or more angles that are below horizontal when a luminaire is oriented as shown in the drawings; such angles include nadir, but are not limited to nadir. Similarly, when light is said to be emitted "upwardly" at least most of such light is emitted across one or more angles that are above horizontal when a luminaire is oriented as shown in the drawings; such angles include zenith, but are not limited to zenith.

Certain embodiments herein provide direct/indirect luminaires that emit light from a waveguide to provide indirect light. These embodiments are designed in appreciation of the fact that use of a waveguide to provide the indirect light can provide manufacturing, economic, installation, safety, compact size, and/or aesthetic advantages. Downlight portion(s) of these luminaires typically provide direct light from first light sources by refracting and/or reflecting light from first light sources so the direct light is emitted generally downwardly. Uplight portion(s) of these luminaires use second light sources to produce light that couples into one or more waveguides. The waveguides provide indirect light by emitting the light from the second light sources generally upwardly. Certain other embodiments tap a portion of light from first light sources that primarily provide downlight, into a waveguide that emits some of the light as uplight.

FIG. 1 schematically illustrates a space 1 that is illuminated by a direct/indirect luminaire 100. Within space 1, an exemplary piece of furniture 5 presents an area 7 where direct lighting might be desired. Direct/indirect luminaire 100 is suspended by one or more cables 110 from ceiling 6 of space 1. Direct/indirect luminaire 100 provides both direct light 101 that illuminates area 7, and ambient light 102 that also illuminates much of space 1, by reflecting from ceiling 6. It should be understood that the boundaries illustrated for both direct light 101 and ambient light 102 are only suggested by the lines shown; such boundaries may vary in size or position, and may not be sharp boundaries at all but rather indicate the general location of diffuse or gradient boundaries.

Figure 2:
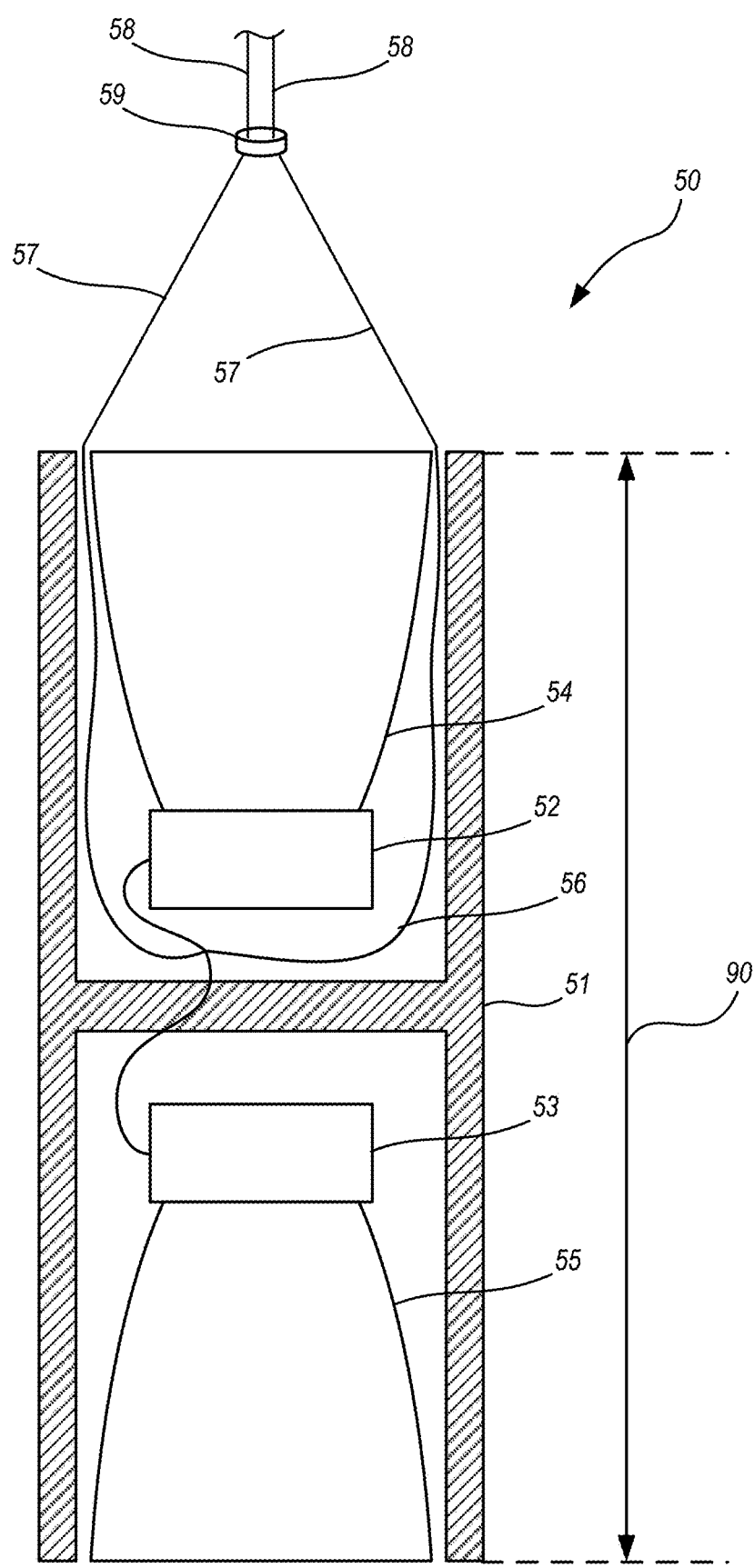
FIG. 2 is a schematic cross-sectional view of a prior art direct/indirect luminaire.

FIG. 2 is a schematic cross-sectional view of a prior art direct/indirect luminaire 50. Aspects of the direct/indirect luminaires disclosed herein are based at least in part on an appreciation of certain issues related to luminaire 50, as now discussed.

Luminaire 50 includes a housing 51, a first light source 52, a second light source 53, first optics 54 and second optics 55. Light sources 52 and 53 are typically the same as one another, and optics 54 and 55 are typically the same as one another. However, each corresponding set of light source and optics typically generates a light distribution that results in an appearance of light being very concentrated, as if from a point source (or nearly a point source, depending on the type of light source 52, 53). That is, optics 54 or 55 may either concentrate or spread a far field distribution of light from the light source 52 or 53 with which it is associated, but optics 54 and 55 typically do not spread the near field distribution, so as to spread the appearance of the corresponding light source 52 or 53 to which it is attached, over a larger area than is occupied by the light source 52 or 53 itself. This can make it difficult to look directly at luminaire 50, due to a high intensity of light at the image of light source 52 or 53. When luminaire 50 is overhead, a natural human aversion response is not to look straight up into light source 52 (just as humans tend not to look up into the sun during the day). However, this aversion response may not be as effective in preventing discomfort in viewing a light source 53 when a viewer is located above a suspended luminaire 50. For example, a viewer may view luminaire 50 from above when the viewer is located on an upper floor or balcony adjacent to an atrium where luminaire 50 is deployed at a lower level within the atrium, causing discomfort if the near-field distribution concentrates an origin of the uplight within a small emitting area. The near field distribution of the uplight can be spread by using diffusing optics, but this solution incurs a cost in efficiency, that is, diffusing optics typically absorb some light while diffusing the rest, reducing net light output and increasing heat generated by luminaire 50.

Wires 56 that provide electrical power to light sources 52 and 53 typically couple with (or are routed adjacent to) one or more cables 57 from which housing 51 is suspended. Optical and/or aesthetic issues arise related to cables 57 (and/or 58, as discussed below). Upwardly emitting light source 52 and associated optics 54 are typically approximately centered within housing 51. Distribution of indirect light provided by the upwardly emitting light source 52 favors leaving a space open directly above the associated optics 54 (e.g., an optical axis of light source 52 and optics 54). However, when luminaire 50 is suspended, housing 51 will be pulled by gravity so as to place cables 57 in the space that is advantageous to leave open. Thus, especially when optics 54 provide a near field distribution of light from light source 52 as a point source or nearly so, cables 57 will generally cast undesirable shadows upward onto adjacent ceiling and/or wall surfaces.

FIG. 2 also shows a retaining device 59 that pulls cables 57 together at a distance above housing 51, with one or more cables 58 running vertically upward from retaining device 59. A device like retaining device 59 is often used to improve the appearance of luminaire 50 over that of a luminaire that uses two cables 57 that each run upwardly from housing 51 for a considerable distance. In another embodiment, retaining device 59 may join cables 57 so that only a single cable 58 would run further upward. However, devices like retaining device 59, and cable(s) 58 running upward therefrom, can create distracting shadows directly along an optical axis of light source 52 and optics 54.

Other aspects of luminaire 50 may be of concern, especially aspects related to light source 52. For example, both light sources 52 and 53 will generate heat, yet they are positioned close to one another such that the generated heat is within a comparatively small portion of luminaire 50, which may present a challenge for heat dissipation. If a diffuser is used with light source 52 to spread upwardly directed light, it will typically incur an optical inefficiency on the order of 5% to 15%, that is, the corresponding amount of light will be lost, turning instead into heat. Also, a top surface of optics 54 is typically concave. A concave top surface may be difficult to clean, and may collect dust or debris, which may present a fire risk.

Figure 3:
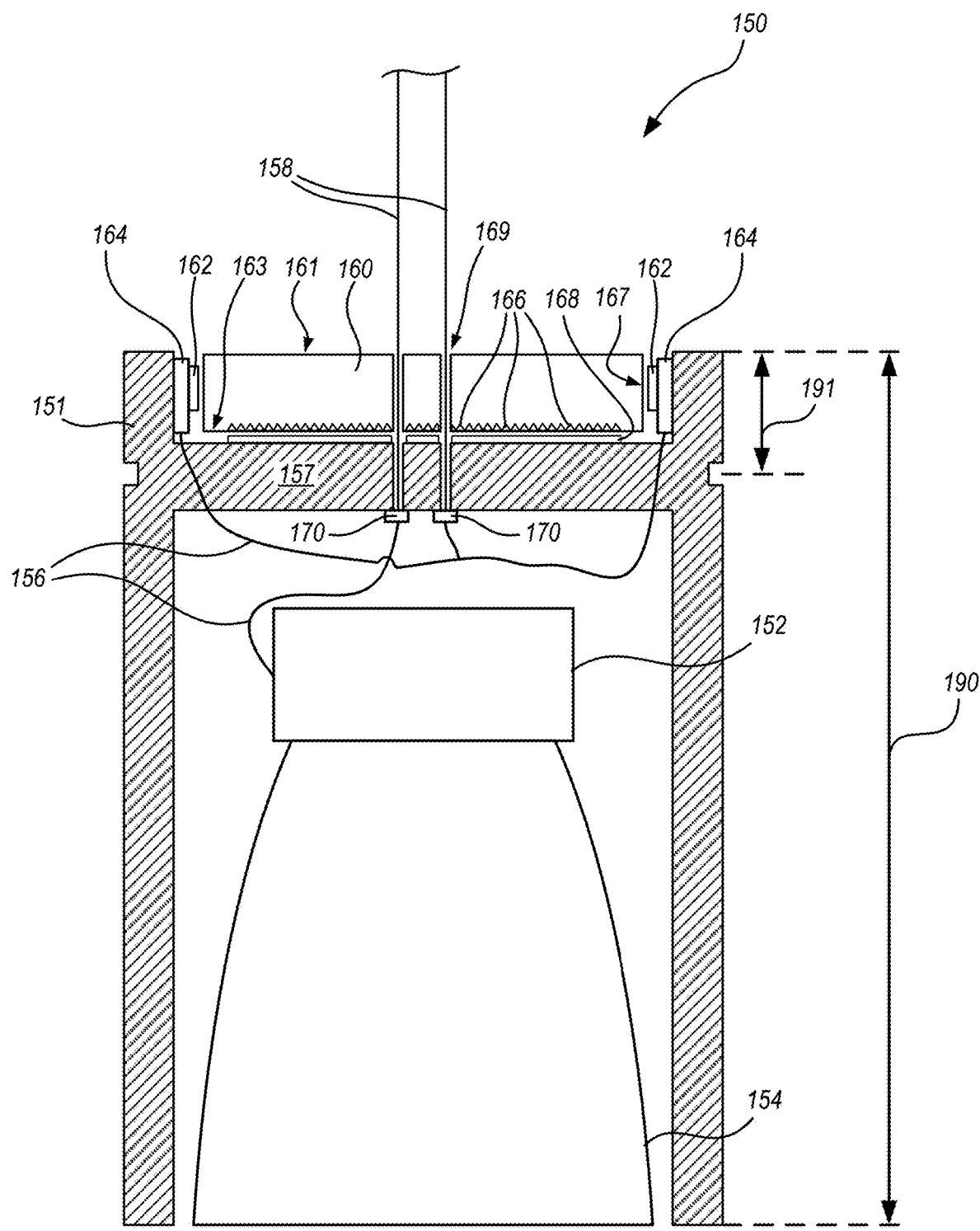
FIG. 3 is a schematic cross-sectional view illustrating a direct/indirect luminaire, according to one or more embodiments.

FIG. 3 is a schematic cross-sectional view illustrating a direct/indirect luminaire 150 that addresses many of the concerns discussed above with respect to luminaire 50. Luminaire 150 includes a housing 151, and a first light source 152 and first optics 154 that provide a first light as direct light (e.g., downlight) emitted downwardly from luminaire 150. Indirect light (e.g., uplight) is supplied by second light sources 162 that are mounted with one or more circuit boards (e.g., printed circuit boards, or PCBs) 164. In FIG. 3, housing 151 and luminaire 150 are cylindrical, but this is not required; in other embodiments, direct/indirect luminaires may have other shapes (e.g., ovals, cuboid/rectilinear shapes and the like) while using the teachings herein.

First light source 152 and first optics 154 may be substantially similar to first light source 52 and first optics 54 of luminaire 50. PCB(s) 164 may be one or more flexible circuit boards that couple with an inner surface of housing 151. PCB(s) 164 may include electrical components that act as power supplies and/or control devices for light sources 162 and/or 152; alternatively, power provided to light sources 162 and/or 152 may be provided and/or controlled externally to luminaire 150 (e.g. an external switch may control electrical power provided to luminaire 150 by an external power supply, LED drivers and the like). Light sources 162 may be, for example, light emitting diodes (LEDs) in either packaged form, or LED chips mounted directly to PCB(s) 164. Light sources 162 emit light that couples into a waveguide 160 that forms at least part of an uppermost optical surface of luminaire 150. Herein, "uppermost optical surface" means the uppermost surface that substantially interacts with light being emitted upwardly, that is, a further transparent cover would not be considered an uppermost optical surface. Light sources 162 need not be identical in color and/or color temperature, because waveguide 160 will act as a mixing chamber to blend the light received, as discussed further below.

Waveguide 160 is a planar portion of an optical material (e.g., glass, acrylic, polycarbonate, other plastics, silicone) with opposing planar faces 161 and 163 joined by one or more edge faces 167 about a periphery of the optical material. The light that couples into waveguide 160 enters through one or more of edge faces 167, and the light is substantially retained in waveguide 160 through total internal reflection, except for locations where total internal reflection does not occur. One mechanism that can defeat total internal reflection at specific locations is when the light interacts with optional scattering features 166 that may be part of, or formed upon, a lower planar face of waveguide 160. Light scattered by scattering features 166 then typically scatters into high angle rays that are not contained by total internal reflection, but are instead emitted from upper face 161 of waveguide 160. Some light scattered by scattering features 166 may scatter downwardly from waveguide 160, so an optional reflector 168 can be added to reflect such light back upwards to be emitted upwardly from waveguide 160.

Thus, a very large portion of the light that is emitted into waveguide 160 emits upwardly from housing 151 and luminaire 150. For example, because total internal reflection is a very optically efficient mechanism for distributing light across an area, and if downwardly scattered light is reflected upwards from optional reflector 168, the net optical efficiency of the uplight portion of luminaire 150 will be higher than an arrangement that uses a diffuser to distribute light (e.g., light source 52 discussed above).

The emitted uplight originates across the area of waveguide 160, so that in some embodiments, the light is characterized as having a visually appealing light distribution of a uniform area source. Distribution of light scattering features 166 can be provided so as to provide more or less light scattering at specific areas; for example, few light scattering features 166 might be provided near light injection edges of waveguide 160 where internal light density is greatest, and many light scattering features 166 might be provided further away from the light injection edges of waveguide 160. This arrangement of light scattering features 166 would provide more uniform light emission across waveguide 160 than if light scattering features 166 were uniformly distributed across waveguide 160. This may be advantageous when luminaire 150 is installed at a height where some might view it from its upper side, for example as a suspended luminaire in an open atrium with some viewing locations available from upper floors that open to the atrium.

Another mechanism that can defeat total internal reflection at specific locations is to provide waveguide 160 with upper surface portions that have non-horizontal surface angles and/or scattering sites. Non-horizontal surface angles can allow light from within waveguide 160 to refract out of waveguide 160 at specific angles. Alternatively, non-horizontal surface angles can reflect the light back into waveguide 160 with a different internal angle than a horizontal angle, so that the reflected light is more susceptible to emission (e.g., no longer meets the total internal reflection criterion). Both of these techniques can be useful, for example, to provide specific uplight distributions such as an asymmetric or elliptical beam, or a "batwing" distribution having high intensity light at specific angles with smaller portions of light across other upward angles. Scattering sites, too, can be configured to cause uplight to be emitted at certain angles, or can be random (e.g., a random surface texture such as could be caused by sandblasting, etching or the like) so as to provide emission of light across a distribution of upward angles.

As shown in FIG. 3, luminaire 150 may be suspended from one or more cables 158 that can pass through waveguide 160 at any location, and advantageously pass through waveguide 160 near a plan view center of housing 151. Cables 158 may, but do not necessarily need to, provide electrical connectivity as well as mechanical support for luminaire 150. That is, electrical connectivity may be provided separately in some embodiments, for example through wires that drape loosely about cables 158. In other embodiments, luminaires similar to luminaire 150 may be suspended using one or more rigid members (e.g., one or more stems) that pass through a waveguide similar to waveguide 160, attaining the same advantages through the use of the waveguide.

In certain embodiments, apertures are formed through waveguide 160 (and reflector 168, if present) such that cables 158 do not mechanically couple thereto. These embodiments may include one or more means 170 for transferring weight of luminaire 150 from a load bearing portion of luminaire 150 to cable(s) 158, while providing strain relief for wiring within luminaire 150. For example, FIG. 3 shows two cables 158, each being secured by a weight transferring means 170 at an underside of a cross member 157 that is formed by housing 151 and acts as the load bearing portion. Housing 151 is not limited to the form shown; that is, other housing features besides a cross member can provide a load bearing portion. Weight transferring means 170 may be any of a stopper knot formed in each cable 158 and which cannot pass through apertures in the load bearing portion, a plug that secures a respective cable 158 and which cannot pass through apertures in the load bearing portion, a clamp that secures a respective cable 158 to the load bearing portion, or other suitable combination of these features, or mechanical equivalent. Thus, weight transferring means 170 transfers weight of luminaire 150 to cable(s) 158. When cables 158 also provide electrical connectivity for luminaire 150, weight transferring means 170 provide strain relief for wiring 156 that is located below the load bearing portion of housing 151.

Numerous advantages may be obtained through the use of compact light sources 162 such as LEDs, waveguide 160, and/or housing 151 to create and manage indirect light from luminaire 150. Such advantages may include any or all of the following. (1) Waveguide 160 can act as an area source of indirect light, which can spread out an apparent source of the indirect light for better viewing comfort, and greatly diminish any distracting shadows generated by cable(s) 158. (2) A height 190 of housing 151 can be significantly reduced in relation to a total height 90 of housing 51 (FIG. 2). For example, a height 191 of the uplight portion of housing 151 may be as little as 5 mm. The reduced height of housing 151 is aesthetically pleasing and reduces material costs. (3) If second light sources 162 of different colors are used (e.g., red, green and blue LEDs mixed to produce white, or white LEDs of different color temperatures), waveguide 160 can act as a mixing chamber so that the projected uplight is uniformly mixed, instead of producing localized spots of one color or another. Additionally, for the configuration shown, (4) light sources 162 are placed at an increased distance from light source 152 so that heat from the two light sources is not concentrated; (5) heat generated by light sources 162 can transfer directly to an upper perimeter of housing 151, assisting further in heat dissipation; (6) by moving light sources 162 to the periphery of housing 151, more area is provided near the center of housing 151 for electrical connections, hanging features (e.g., stems, cables) and the like; and (7) by placing PCBs 164 and light sources 162 within a raised upper portion of housing 151, uplight provided by light sources 162 is prevented from emitting downwardly or outwardly, so that no features of luminaire 150 that are illuminated by the uplight is visible from below. Still other advantages will be readily understood by one skilled in the art, upon reading and comprehending the present disclosure. As discussed below, other embodiments benefit from one or more of these advantages.

Optional reflector 168 can also provide various advantages. For example, reflector 168 can act as a heat spreader, to move heat from first light source 152 toward the periphery of housing 151 where the heat may dissipate to ambient air. When reflector 168 is not present, an underside of waveguide 160 can be provided with a reflective (e.g., metalized or painted) surface to ensure that light scattered by scattering features 166 exits through the upper face 161 of waveguide 160.

Figure 4:
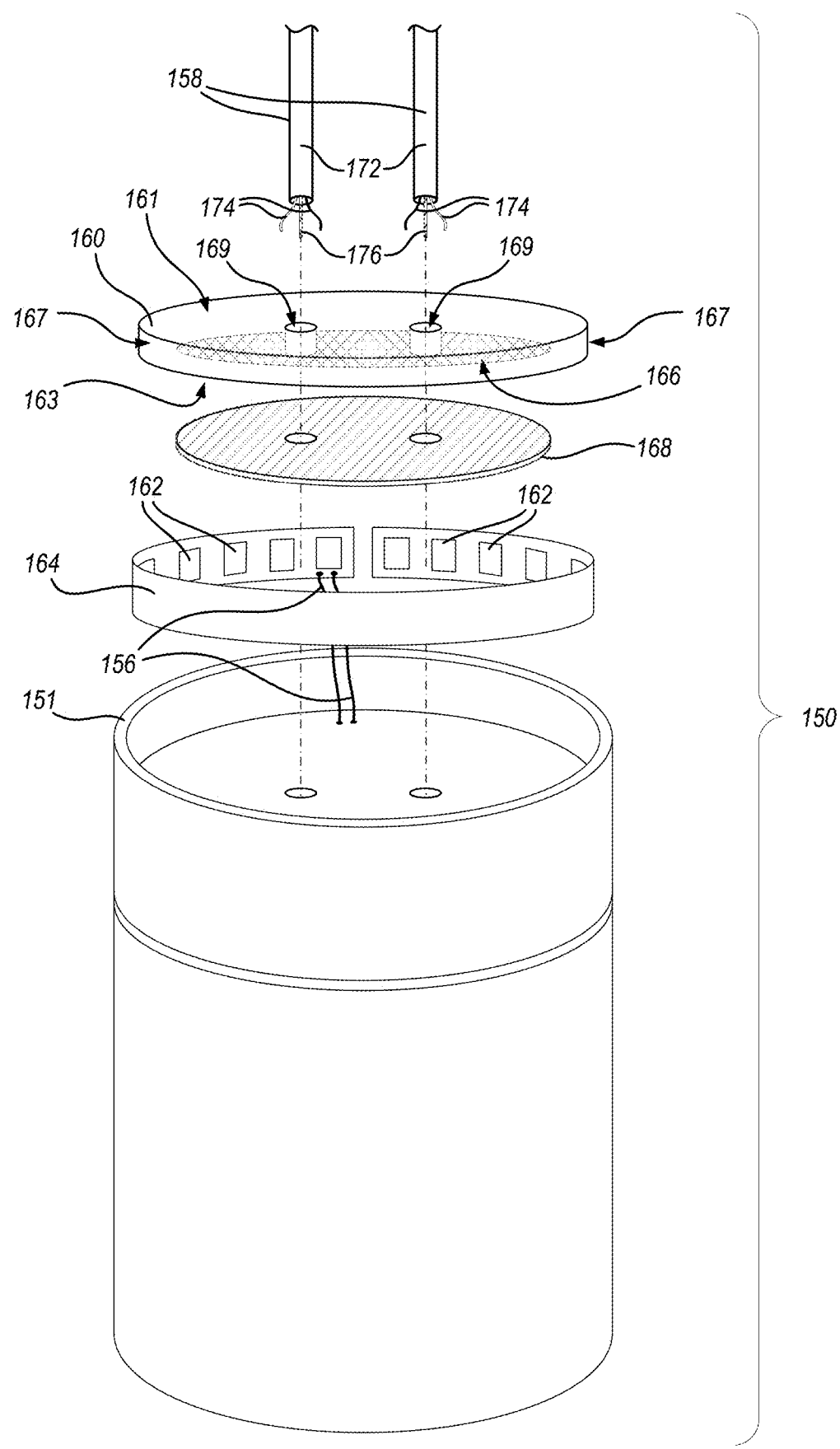
FIG. 4 is an exploded schematic view of the luminaire of FIG. 3.

FIG. 4 is a partially exploded, schematic view of luminaire 150 to assist in visualizing how certain components thereof relate to one another, and to provide additional description. Cables 158 are shown as having outer jackets 172, electrical wires 174, and a load bearing core 176. Any of outer jackets 172, electrical wires 174, and load bearing core 176 are optional, as long as at least one of such materials is present. That is, for example, electrical wires 174 could act as load bearing materials of cables 158 without an outer jacket 172 and/or load bearing core 176; similarly, cables 158 could consist solely of a load bearing core 176 without an outer jacket 172 or electrical wires 174 (in which case, electrical connectivity would be supplied separately). Cables 158 pass through apertures 169 in waveguide 160, optional reflector plate 168 (if present) and housing 151, where appropriate mechanical and/or electrical connections are made. PCB 164 is shown as a single, strip-like (e.g., flexible) PCB curved into a circle, with light sources 162 thereon. Wires 156 provide electrical connectivity for PCB 164, extending into housing 151 (e.g., to interface electrically with cables 158 and/or first light source 152). The use and compact form of PCB 164 and light sources 162 with waveguide 160 (with optional scattering features 166 on an underside thereof) enables simple assembly of luminaire 150. Although PCB 164 is shown as a single PCB, the functionality provided by PCB 164 could be provided by two or more PCBs. PCB 164 may be secured in any manner, such as mechanically (e.g., with screws or other fasteners, interference or snap fitting) and/or using adhesives. Covers and/or coatings may be utilized to protect PCB 164 and/or light sources 162.

Figure 5:
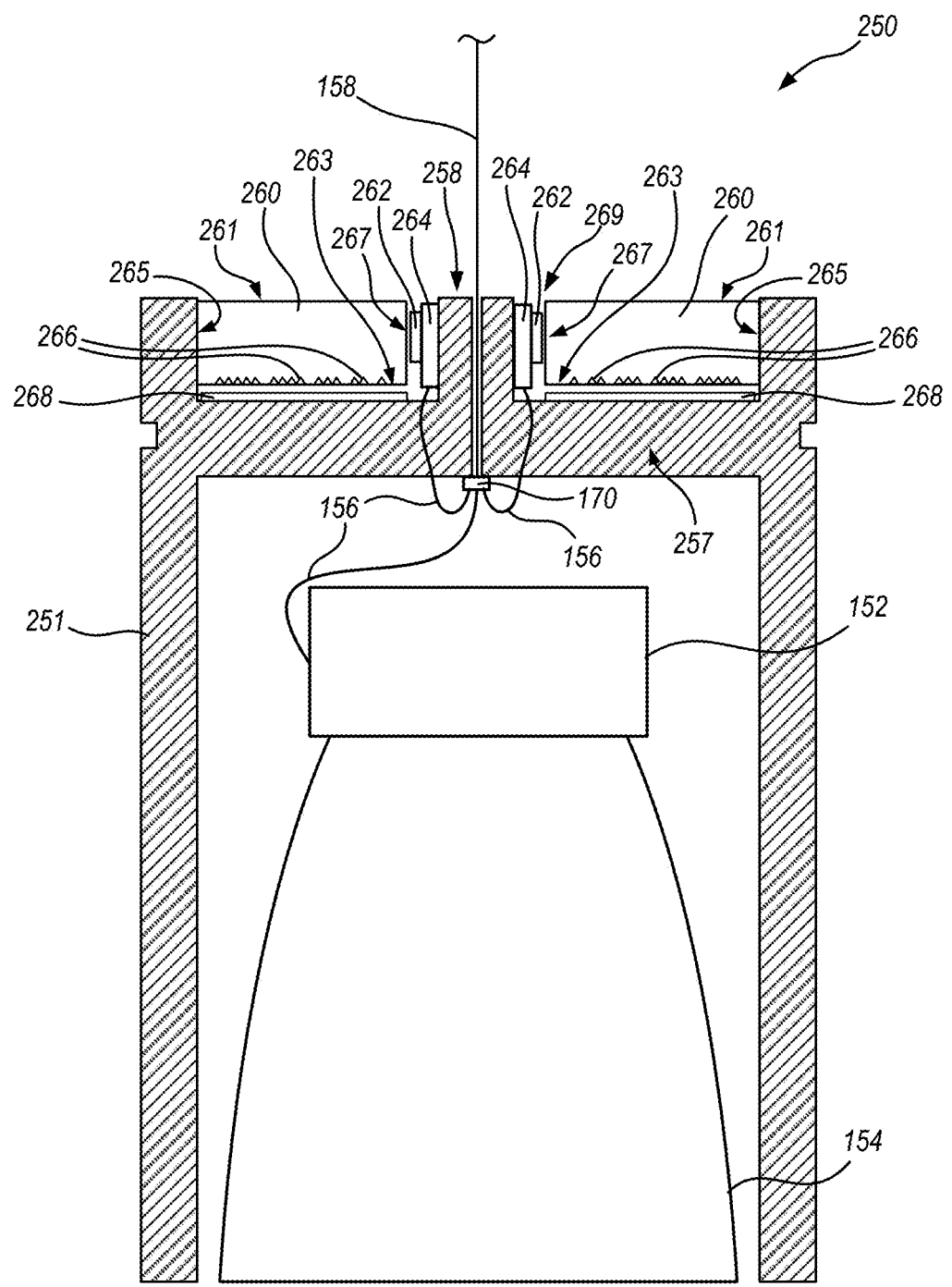
FIG. 5 is a schematic cross-sectional view illustrating another direct/indirect luminaire, according to one or more embodiments.

FIG. 5 is a schematic cross-sectional view illustrating a direct/indirect luminaire 250. Luminaire 150 includes a housing 251, and a first light source 152 and first optics 154 that are substantially similar to first light sources and optics shown in luminaires 50 and 150. Indirect light (e.g., uplight) is supplied by second light sources 262 that are mounted with one or more PCBs 264. Similar to housing 151 and luminaire 150 (FIGS. 3 and 4), housing 251 and luminaire 250 are cylindrical in aspect, but this is not required.

In luminaire 250, housing 251 includes an inner portion 258 that is bounded on all sides by a horizontal portion 257. Inner portion 258 may protrude upwardly relative to horizontal portion 257, but this is not required. Light sources 262 (which may be, for example, light emitting diodes (LEDs) in packaged or chip form) mount to one or more PCBs 264, which may be flexible PCB(s) affixed to inner portion 258. Light sources 262 emit light that couples into a waveguide 260 that forms at least part of an uppermost optical surface of luminaire 250. Like waveguide 160 (FIGS. 3 and 4), waveguide 260 is a planar portion of an optical material (e.g., glass, polycarbonate, acrylic, other plastics, silicone) with opposing planar faces 261 and 263. Waveguide 260 forms an aperture 269 with a clearance to accommodate inner portion 258, and the opposing planar faces 261 and 263 are joined by edge faces 267 of the aperture. That is, there may be vertical edge faces 267 where waveguide 260 faces light sources 262, but outer edge faces 265 of waveguide 260 could be rounded or some other shape, as the outer edge faces 265 are not light coupling surfaces. When inner portion 258 protrudes upwardly from horizontal portion 257, and the inner edge 267 of waveguide 260 is vertical, second light sources 262 may be in face to face relation with the inner edge, as shown. However, again, this is not required; inner portion 258 need not protrude upwardly, second light sources 262 may not be oriented as shown, and may not be in face to face relation with the inner edge 267. One skilled in the art, upon reading and comprehending the present disclosure, will readily conceive of many alternatives and equivalents. The light that couples into waveguide 260 is substantially retained therein through total internal reflection, except at scattering features 266, similar to scattering features 166 described above. Scattering features 266 are shown arranged in a distribution with more scattering features 266 near the outer edges of waveguide 260, and fewer scattering features 266 near second light sources 262, to compensate for light density within waveguide 260 being greater nearer second light sources 262. However, this distribution is only exemplary; those skilled in the art will be able to provide variations on this layout to serve aesthetic and/or functional needs of a given application. An optional reflector 268 may be included; these elements are similar in function to reflector 168, FIGS. 3 and 4, but may be different in layout, to accommodate inner portion 258. Thus, at least a portion of the light that is emitted into waveguide 260 emits upwardly from housing 251 and luminaire 250.

Cable 158, weight transferring means 170 and wiring 156 are similar to like items shown in luminaire 150. Because light sources 262 emit outwardly from the inner portion of housing 151 toward its edges, the uplight portion luminaire 150 can be thought of as a "center-firing" arrangement as opposed to the "edge-firing" arrangement illustrated in FIGS. 3 and 4.

FIGS. 6-10 are schematic cross-sectional views illustrating portions of respective direct/indirect luminaires. These drawings illustrate techniques that can be adapted to produce a variety of functions and visual effects. Upon reviewing FIGS. 6-10, and reading and comprehending the following explanations, one of ordinary skill in the art will readily conceive many equivalents, extensions, and alternatives to the specific, disclosed luminaire features and types, all of which are within the scope of embodiments herein.

Figure 6:
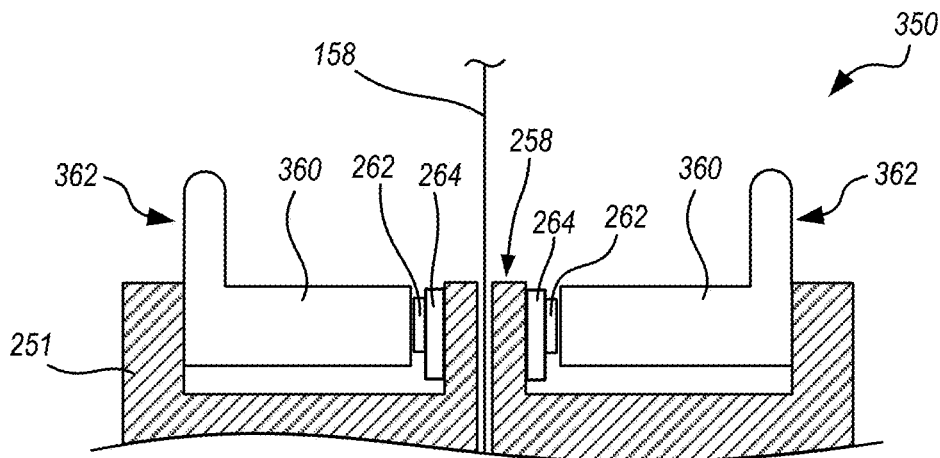
FIG. 6 schematically illustrates a direct/indirect luminaire that includes a waveguide with upward protrusions, according to one or more embodiments.

FIG. 6 schematically illustrates a direct/indirect luminaire 350 that includes a waveguide 360 with upward protrusions 362. Luminaire 350 includes the same housing 251, PCB(s) 264 and light sources 262 as luminaire 250, FIG. 5. Upward protrusions 362 are shown at radially outside edges of waveguide 360, and with rounded upper ends, but protrusions 362 may be located and/or shaped differently. In particular, shape(s) of protrusions 362 may be modified so as to direct portions of the uplight from second light sources 262 in desired directions. For example, the rounded ends shown in FIG. 6 will encourage all light reaching the rounded ends to exit waveguide 360, such that the end will appear bright in a direct view and will emit the light in all directions. Luminaire 350 is shown without a reflector and/or scattering features below waveguide 360; similar to the case noted for luminaire 150, an underside of waveguide 360 can be provided with a reflective (e.g., metalized or painted) surface to encourage light to exit through the upper surface of waveguide 360, and/or protrusions 362.

Figure 7:
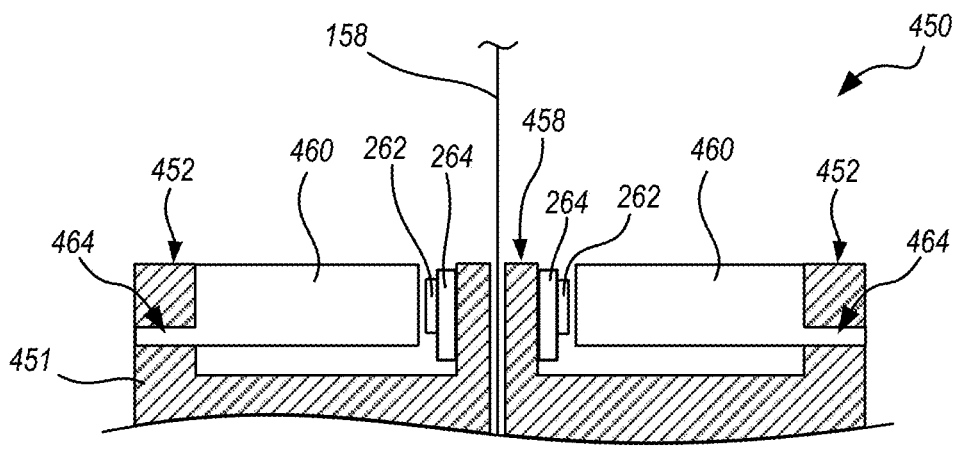
FIG. 7 schematically illustrates a direct/indirect luminaire that includes a waveguide having outward protrusions that extend through a housing, so as to emit a portion of light outwardly therefrom, according to one or more embodiments.

FIG. 7 schematically illustrates a direct/indirect luminaire 450 that includes a waveguide 460 having outward protrusions 464 that extend through a housing 451, so as to emit a portion of light outwardly therefrom, providing visual interest. Luminaire 450 includes the same PCB(s) 264 and light sources 262 as luminaires 250 and 350, FIGS. 5 and 6, emitting light into waveguide 460 from an inner portion 458 of housing 451, in a center-firing arrangement. However, housing 451 allows outward protrusions 464 of waveguide 460 to extend therethrough. Outward protrusions 464 as illustrated in the cross-sectional view of FIG. 7 may be a single, radial protrusion, in which case an uppermost portion 452 may not be contiguous with housing 451 but form a separate element that can be fastened to waveguide 460 with adhesives or the like. Alternatively, outward protrusions 464 may be azimuthally intermittent about a periphery of waveguide 460; that is, outward protrusions 464 may be features that extend through corresponding apertures of housing 451.

Figure 8:
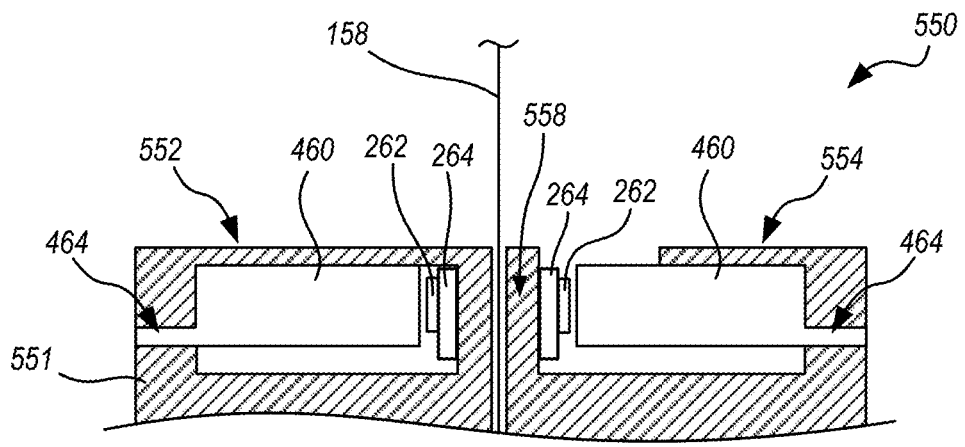
FIG. 8 schematically illustrates a direct/indirect luminaire that includes a waveguide with outward protrusions, and a housing with upper housing surfaces, according to one or more embodiments.

FIG. 8 schematically illustrates a direct/indirect luminaire 550 that includes waveguide 460 with outward protrusions 464 (the same waveguide as in luminaire 450, FIG. 7) and upper housing portions 552, 554. Luminaire 550 includes the same PCB(s) 264 and light sources 262 as luminaires 250, 350 and 450, FIGS. 5, 6 and 7, emitting light into waveguide 460 from an inner portion 558 of housing 551, in a center-firing arrangement. Like housing 451 of luminaire 450, housing 551 also allows outward protrusions 464 to extend therethrough, so as to emit a portion of light outwardly therefrom, providing visual interest. Housing 551 also includes upper housing portions 552 and 554, as shown, to demonstrate variations in housing shapes. On the left hand side of FIG. 8, upper housing portion 552 covers an upper surface of waveguide 460 such that (in the cross-sectional portion shown) light from light source 262 would be emitted only through outward protrusion 464. On the right hand side of FIG. 8, upper housing portion 554 only partially covers an upper surface of waveguide 460 such that (in the cross-sectional portion shown) some light from light source 262 may be emitted through outward protrusion 464 while other light from light source 262 may be emitted through the uncovered upper surface of waveguide 460. It is not required to arrange upper portions of a housing exactly as shown in FIG. 8; housing portions 552 and 554 are shown only to explain possible features that can be rearranged to achieve a desired light distribution and/or for visual interest.

Figure 9:
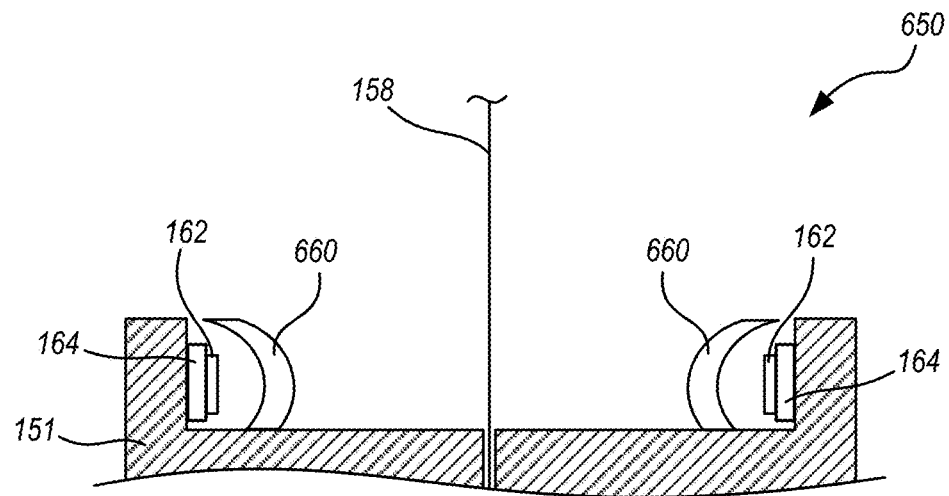
FIG. 9 schematically illustrates a direct/indirect luminaire that includes an optic, according to one or more embodiments.
Figure 10:
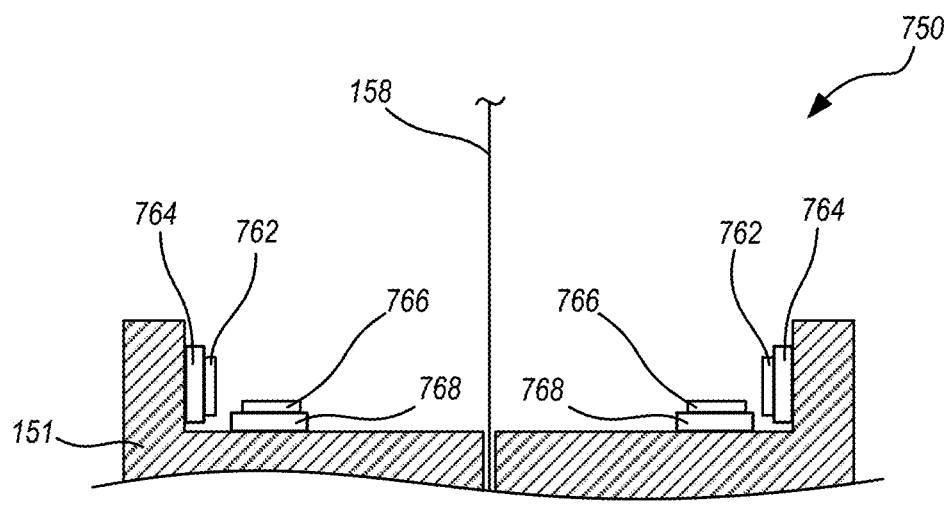
FIG. 10 schematically illustrates another direct/indirect luminaire, according to one or more embodiments.

FIGS. 9 and 10 are schematic cross-sectional views illustrating portions of direct/indirect luminaires that do not include waveguides. These drawings illustrate techniques that can be adapted to produce a variety of functions and visual effects. Upon reviewing FIGS. 9 and 10, and reading and comprehending the following explanations, one of ordinary skill in the art will readily conceive many equivalents, extensions, and alternatives to the specific, disclosed luminaire features and types, all of which are within the scope of embodiments herein.

FIG. 9 schematically illustrates a direct/indirect luminaire 650 that includes an optic 660. Luminaire 650 includes the same housing 151, PCB(s) 164 and light sources 162 as luminaire 150, FIGS. 2 and 3, but modifications are possible, as discussed below. Optic 660 can be provided with specular or diffuse surfaces to redirect light from light sources 162, without or with diffusion, respectively. For example, Lambertian, "batwing," elliptical or asymmetrical distributions can be provided. PCBs 164 and light sources 162 need not be positioned exactly as shown in FIG. 9; also, changes to the housing shown are possible (e.g., center-firing arrangements, as shown in FIGS. 5-8, may be used). Optic 660 may be adapted to provide protection for PCB 164 and/or light sources 162, and covers and/or coatings may also be utilized to provide such protection. FIG. 10 schematically illustrates a direct/indirect luminaire 750 that can optionally include PCB(s) 764 with light sources 762, and/or PCB(s) 768 with light sources 766. Any number, combination or arrangement of the PCB(s) and light sources shown in FIG. 10 may be used. Luminaire 750 also includes the same housing 151 as luminaires 150 and 650, FIGS. 2, 3 and 9, but modifications are possible. Luminaires 650 and 750 represent very low cost and compact alternatives to providing uplight from a luminaire.

Figure 11:
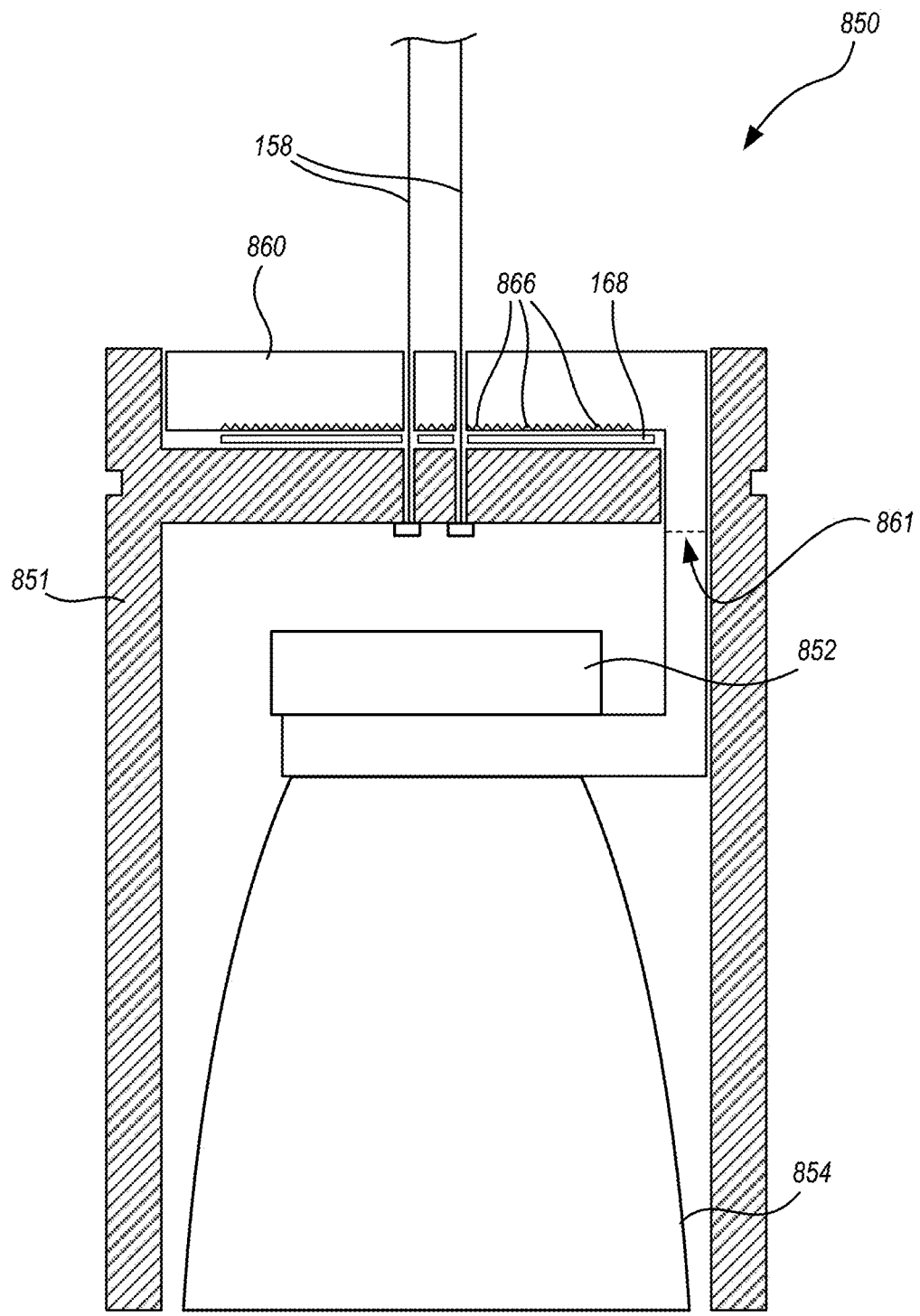
FIG. 11 schematically illustrates a direct/indirect luminaire including a waveguide that obtains light from a downlight source, and redirects a portion of the light to provide uplight, according to one or more embodiments.

FIG. 11 schematically illustrates a direct/indirect luminaire 850 including a waveguide 860 that obtains light from a downlight source 852, and redirects a portion of the light to provide uplight. A housing 851 provides mechanical support for the components shown. Electrical interconnection is not shown in FIG. 11 for illustrative clarity, but can be provided in similar manner to that shown in FIGS. 3-5 discussed above. A light source 852 provides light for both uplight and downlight purposes; an optic 854 can redirect a portion of the light from light source 852 to provide downlight, while scattering features 866 of waveguide 860 redirects another portion of the light from light source 852 to provide uplight. Portions of waveguide 860 may be externally coated with a reflective material (e.g., a metalized coating) to increase transmission efficiency of waveguide 860 to an upper surface of luminaire 850. Also, waveguide 860 may be provided in multiple pieces for assembly purposes. For example, a break in waveguide 860 may occur at location 861 shown in FIG. 11, so that upper and lower portions of waveguide 860 can be assembled separately. Luminaire 850 includes cables 158 and optional reflector 168 as in luminaire 150, FIGS. 2 and 3, to show that such components could be used, but these components can be rearranged, substituted or omitted, as would be apparent to one skilled in the art upon reading and comprehending this disclosure.

The foregoing is provided for purposes of illustrating, explaining, and describing embodiments of the present invention. Further modifications and adaptations to these embodiments will be apparent to those skilled in the art and may be made without departing from the scope or spirit of the invention. Different arrangements of the components depicted in the drawings or described above, as well as components and steps not shown or described, are possible. Similarly, some features and subcombinations are useful and may be employed without reference to other features and subcombinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications can be made without departing from the scope of the claims below.

What is claimed is:

1. A luminaire, comprising:
   a housing;
   a downlight that includes one or more first light sources configured to emit a first light downwardly from the housing;
   a waveguide, formed of an optical material and comprising opposing faces joined by one or more edge faces about a periphery of the optical material,
      the waveguide forming at least a portion of an uppermost optical surface of the luminaire, and defining an aperture therethrough;
   one or more second light sources, coupled with the housing and configured to emit a second light into the optical material through at least one of the one or more edge faces; and
   a rigid stem, wherein the housing is configured to be suspended using the rigid stem;
   wherein:
   the waveguide is configured to emit at least a portion of the second light upwardly from an upper one of the opposing faces; and
   the rigid stem extends through the aperture.

2. The luminaire of claim 1, wherein:
   the housing forms a cylinder;
   the one or more first light sources are disposed within the cylinder; and
   the one or more second light sources couple with an inner surface of the cylinder.

3. The luminaire of claim 1, wherein the one or more second light sources are light emitting diodes coupled with an inner periphery of the housing.

4. The luminaire of claim 1, wherein the rigid stem extends through a load bearing portion of the housing wherein at least part of a weight of the luminaire transfers from the load bearing portion to the rigid stem.

5. The luminaire of claim 1, wherein a lower one of the opposing faces of the waveguide is configured to scatter the portion of the second light upwardly.

6. The luminaire of claim 1, wherein:
   the rigid stem is a first rigid stem;
   the luminaire further comprises a second rigid stem;
   the housing is configured to be suspended using both the first and second rigid stems;
   the waveguide defines at least two apertures therethrough;
   the first rigid stem extends through a first one of the apertures; and
   the second rigid stem extends through a second one of the apertures.

7. The luminaire of claim 1, further comprising a reflector disposed beneath the waveguide.

8. The luminaire of claim 7, further comprising a cable configured to provide electrical power to the first and second light sources, and wherein:
   the reflector forms an aperture therethrough;
   the aperture through the waveguide aligns vertically with the aperture through the reflector; and
   the cable extends through:
      the rigid stem;
      the aperture through the waveguide; and
      the aperture through the reflector.

9. The luminaire of claim 8, wherein:
   the rigid stem is a first rigid stem;
   the luminaire further comprises a second rigid stem;
   the housing is configured to be suspended using both the first and second rigid stems;
   the waveguide defines at least two apertures therethrough;
   the reflector defines at least two apertures therethrough;
   the first rigid stem extends through a first one of the apertures through the waveguide, and through a first one of the apertures through the reflector; and
   the second rigid stem extends through a second one of the apertures through the waveguide, and through a second one of the apertures through the reflector.

10. A method of lighting an area with a suspended luminaire, comprising:
    providing a luminaire that includes a housing, a first light source, one or more second light sources, and a waveguide that forms at least a portion of an uppermost optical surface of the luminaire, wherein the waveguide is formed of a portion of an optical material and characterized by opposing planar faces joined by one or more edge faces about a periphery of the optical material;
    suspending the luminaire from at least one rigid stem that passes through the waveguide;
    emitting a first light downwardly from the first light source;
    emitting a second light, from the one or more second light sources, into one or more of the edge faces of the waveguide; and
    scattering at least a first portion of the second light upwardly from the waveguide, through an upper one of the planar faces.

11. The method of claim 10, wherein providing the second light comprises providing the second light sources arranged in face to face relation with the one or more of the edge faces of the waveguide.

12. The method of claim 10, wherein providing the second light comprises scattering the first portion of the second light from scattering features on a lower one of the planar faces.

13. The method of claim 10, wherein providing the second light comprises reflecting a second portion of the second light from a reflector disposed beneath a lower one of the planar faces.

14. The method of claim 10, wherein suspending the luminaire comprises securing the housing to the rigid stem so as to transfer at least part of the weight of the luminaire to the rigid stem.

15. The method of claim 10, wherein suspending the luminaire comprises securing the housing to two or more rigid stems so as to transfer at least part of the weight of the luminaire to the two or more rigid stems, and wherein each of the two or more rigid stems passes through the waveguide.

16. A luminaire, comprising:
    a housing that forms:
       a horizontal portion, and
       an inner portion that extends upwardly from the horizontal portion, the inner portion being bounded on all horizontal sides by the horizontal portion;
    a downlight that includes one or more first light sources configured to emit a first light downwardly from the housing;
    a waveguide, formed of an optical material and disposed horizontally atop the horizontal portion of the housing, the waveguide forming at least a portion of an uppermost optical surface of the luminaire, wherein:
the waveguide defines an aperture therethrough, the aperture being sized and shaped to fit about the inner portion of the housing, and
the waveguide forms one or more edge faces about the aperture;
a rigid stem that passes through the aperture, and is configured to suspend the luminaire;
one or more second light sources, coupled with the housing and configured to emit a second light into the optical material through at least one of the one or more edge faces; and wherein:
the waveguide is configured to emit at least a portion of the second light upwardly from an upper surface of the waveguide, and
the one or more second light sources are coupled with the inner portion of the housing, and emit the second light into at least one of the one or more edge faces of the waveguide.

17. The luminaire of claim 16, wherein:
the inner portion protrudes vertically upward relative to the horizontal portion;
the at least one of the one or more edge faces is substantially vertical; and
the one or more second light sources are oriented in face to face relation with the at least one of the one or more edge faces.

18. The luminaire of claim 16, wherein the waveguide is bounded on all horizontal sides by the housing.

19. The luminaire of claim 16, wherein the waveguide forms outward protrusions that extend through corresponding apertures of the housing.

20. The luminaire of claim 16, wherein the waveguide extends as a single radial protrusion over the horizontal portion of the housing, and an uppermost portion of the housing is fastened atop the waveguide with an adhesive.

* * * * *